United States Patent
Li et al.

(10) Patent No.: US 11,088,950 B2
(45) Date of Patent: Aug. 10, 2021

(54) METHOD AND DEVICE FOR CHECKING FORWARDING TABLES OF NETWORK NODES BY MEANS OF CHECK PACKETS

(71) Applicant: HUAWEI TECHNOLOGIES CO., LTD., Guangdong (CN)

(72) Inventors: Guoping Li, Shenzhen (CN); Zhenwei Zhang, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/842,331

(22) Filed: Apr. 7, 2020

(65) Prior Publication Data

US 2020/0304410 A1 Sep. 24, 2020

Related U.S. Application Data

(63) Continuation of application No. 16/123,576, filed on Sep. 6, 2018, now Pat. No. 10,659,359, which is a (Continued)

(30) Foreign Application Priority Data

Mar. 8, 2016 (CN) .......................... 201610130617.4

(51) Int. Cl.
*H04L 12/741* (2013.01)
*H04L 12/721* (2013.01)
(Continued)

(52) U.S. Cl.
CPC .............. *H04L 45/745* (2013.01); *H04L 1/00* (2013.01); *H04L 12/40* (2013.01); *H04L 12/44* (2013.01);
(Continued)

(58) Field of Classification Search
CPC .. H04L 45/745; H04L 41/0677; H04L 41/112; H04L 43/0823; H04L 45/26;
(Continued)

(56) References Cited

U.S. PATENT DOCUMENTS 6,295,296 B1 9/2001 Tappan
7,948,900 B2 5/2011 Hart et al.
(Continued)

FOREIGN PATENT DOCUMENTS

CN 1741533 A 3/2006
CN 1964360 A 5/2007
(Continued)

OTHER PUBLICATIONS

Anonymous: Multiprotocol Label Switching—Wikipedia, Mar. 2, 2016, XP055525027 pp. 1-5.
(Continued)

*Primary Examiner* — Mewale A Ambaye

(57) ABSTRACT

A network device checks forwarding tables of routers in a network by sending check packets designed to reach a target router via label-forwarding. The network device determines a forwarding path from itself to a destination IP address, with the target router on the forwarding path and at N hops from itself. The network device then generates and sends a check packet having a label stack with N link labels correspond to the hops and a TTL value set to N+1. When the check packet is routed by the target router to a next-hop node of the target router, the TTL value is deducted to 0, causing the next-hop node to send a notification message to the network device. Based on the identity of the next hop node, the network device determines whether the forwarding table of the target router is correct.

15 Claims, 6 Drawing Sheets

Related U.S. Application Data continuation of application No. PCT/CN2016/110467, filed on Dec. 16, 2016.

(51) Int. Cl.

| | | |
|---|---|---|
| *H04L 12/24* | (2006.01) | |
| *H04L 12/751* | (2013.01) | |
| *H04L 12/26* | (2006.01) | |
| *H04L 1/00* | (2006.01) | |
| *H04L 12/40* | (2006.01) | |
| *H04L 29/12* | (2006.01) | |
| *H04L 12/44* | (2006.01) | |
| *H04L 29/08* | (2006.01) | |

(52) U.S. Cl.
CPC .......... *H04L 41/06* (2013.01); *H04L 41/0677* (2013.01); *H04L 41/12* (2013.01); *H04L 43/0823* (2013.01); *H04L 45/02* (2013.01); *H04L 45/26* (2013.01); *H04L 61/20* (2013.01); *H04L 61/2007* (2013.01); *H04L 69/324* (2013.01)

(58) Field of Classification Search
CPC ... H04L 61/2007; H04L 69/324; H04L 45/02; H04L 40/24; H04L 41/06; H04L 41/12; H04L 61/20; H04L 1/00; H04L 12/40; H04L 12/42; H04L 12/44
See application file for complete search history.

(56) References Cited

U.S. PATENT DOCUMENTS

| | | | | |
|---|---|---|---|---|
| 9,705,747 | B1* | 7/2017 | Xue | ........................ H04L 41/12 |
| 10,326,830 | B1* | 6/2019 | Singh | .................. H04L 67/1004 |
| 2003/0046390 | A1* | 3/2003 | Ball | ........................ H04L 41/12 |
| | | | | 709/224 |
| 2004/0252694 | A1 | 12/2004 | Adhikari et al. | |
| 2006/0092856 | A1 | 5/2006 | Mitsumori | |
| 2007/0291722 | A1 | 12/2007 | Lee | |
| 2008/0031257 | A1* | 2/2008 | He | ......................... H04L 43/50 |
| | | | | 370/395.31 |
| 2008/0279110 | A1 | 11/2008 | Hart et al. | |
| 2016/0021028 | A1 | 1/2016 | Koide | |
| 2016/0134518 | A1* | 5/2016 | Callon | .................... H04L 45/54 |
| | | | | 370/390 |
| 2017/0207993 | A1 | 7/2017 | Stone et al. | |

FOREIGN PATENT DOCUMENTS

| | | | |
|---|---|---|---|
| CN | 1992672 A | 7/2007 | |
| CN | 101924670 A | 12/2010 | |
| CN | 102148700 A | 8/2011 | |
| CN | 102347905 A | 2/2012 | |
| CN | 102368734 A | 3/2012 | |
| CN | 102726000 A | 10/2012 | |
| CN | 104168157 A | 11/2014 | |
| JP | 2001274832 A | 10/2001 | |
| JP | 2012080389 A | 4/2012 | |
| JP | 2012239125 A | 12/2012 | |
| JP | 2014502063 A | 1/2014 | |
| WO | 9621301 A1 | 7/1996 | |
| WO | 2010111043 A2 | 9/2010 | |
| WO | 2012077308 A1 | 6/2012 | |
| WO | WO-2012077308 A1 * | 6/2012 | ............. H04L 45/26 |
| WO | 2014073040 A1 | 5/2014 | |
| WO | 2014119028 A1 | 8/2014 | |

OTHER PUBLICATIONS

G. Kessler et al: A Primer on Internet and TCP/IP Tools and Utilities;rfc2151Ixt Jun. 1, 1997 XP015007935, 63 pages.
Toshikazu Watanabe et al.,"Ping command—secret of utilization"— Part 2 Techniques for efficiently using ping, Network World, Aug. 1, 2005, vol. 10, No. 8, pp. 77 to 87 with 5 pages English translation.

* cited by examiner

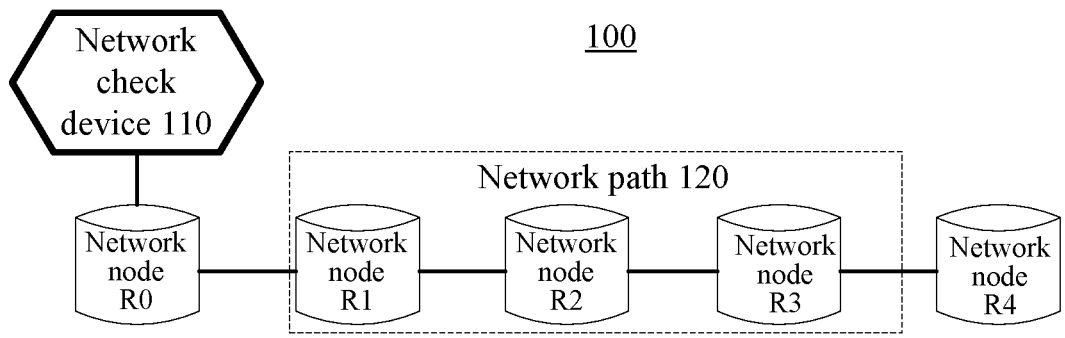

FIG. 1

| A network check device generates a check packet according to a destination IP address and network topology information, where the check packet includes a label stack, TTL, a source IP address, and the destination IP address; where the label stack includes N link labels, a value of TTL is N+1 | 201 |

The network check device sends the check packet according to a topmost link label of the label stack — 202

A network node receives the check packet, pops a topmost link label of the label stack, and subtracts 1 from the value of TTL — 203

204 — The network node determines whether the label stack is empty

Not empty → The network node forwards the check packet according to the topmost link label of the label stack — 205

Empty ↓

The network node forwards the check packet to a feedback node according to the destination IP address and a forwarding table of the network node — 206

The feedback Node receives the check packet, subtracts 1 from the value of TTL, and sends a notification message to the network check device when determining that the value of TTL is 0 — 207

The network check device receives the notification message, and determines, according to the notification message and the network topology information, whether the forwarding table of the network node is correct — 208

FIG. 2

METHOD AND DEVICE FOR CHECKING FORWARDING TABLES OF NETWORK NODES BY MEANS OF CHECK PACKETS

CROSS-REFERENCE TO RELATED APPLICATIONS

This application is a continuation of U.S. patent application Ser. No. 16/123,576, filed on Sep. 6, 2018, which is a continuation of International Application No. PCT/CN2016/110467, filed on Dec. 16, 2016, which claims priority to Chinese Patent Application No. 201610130617.4, filed on Mar. 8, 2016. All of the aforementioned patent applications are hereby incorporated by reference in their entireties.

TECHNICAL FIELD

The present invention relates to the field of communication technologies, and in particular to a method and a device for checking forwarding tables of routers in a network.

BACKGROUND

On an Internet Protocol (IP) network, one route entry corresponds to one IP address in a routing table on a control plane of a network device. For example, an IP address 192.168.1.1 corresponds to a route entry 192.168.1.0/24. However, a data packet is instructed to be forwarded by a forwarding table (forwarding table) on a forwarding plane (usually a forwarding chip) of the network device. The forwarding table may also be referred to as a forwarding information base (forwarding information base, FIB for short). The forwarding table of the network device is usually generated according to an optimal route in the routing table, or may be generated based on the Address Resolution Protocol (ARP).

The IP network does not ensure high reliability. Anomalies such as data packet loss or error may be caused by a link fault on the network, by a lack of a corresponding forwarding entry to be generated on the network device, by an error in the generated forwarding entry, or by other reasons.

SUMMARY

Embodiments of this application provide a method and an apparatus for checking a forwarding table, and a device, to check whether a forwarding table on a network device is incorrect.

A first aspect provides a method for checking a forwarding table, including: generating, by a network checking device, a check packet according to a destination IP address and network topology information, where the check packet includes a label stack, time to live (TTL), a source IP address, and the destination IP address; where the label stack includes N link labels, a value of TTL is 1 added to N, that is, N+1, the source IP address is an IP address of the network checking device, N is a quantity of hops from the network checking device to a to-be-checked network node, and N is a positive integer greater than or equal to 1 (may be denoted as N≥1); and sending, by the network checking device, the check packet according to a topmost link label of the label stack, so that the check packet is sent to the to-be-checked network node according to the label stack. There may be an intermediate network node between the network checking device and the to-be-checked network node. The network checking device forwards the check packet to a next-hop node, that is, the intermediate network node according to the topmost link label of the label stack. Alternatively, the next-hop node of the network checking device may be the to-be-checked network node. The network checking device sends the check packet to the to-be-checked network node according to the topmost link label of the label stack. The network checking device receives a notification message, where the notification message is used to notify the network checking device that a feedback node has received the check packet forwarded by the to-be-checked network node, and determines, according to the notification message and the network topology information, whether a forwarding table of the to-be-checked network node is correct. The feedback node is a next-hop node of the to-be-checked network node. The network checking device usually receives the notification message from the feedback node.

In this way, when a data packet destined for the destination IP address is lost or incorrectly forwarded, or the forwarding table of the to-be-checked network node on a forwarding path to the destination IP address needs to be checked according to a customer requirement or another situation, the network checking device generates a check packet that includes a specific label stack and a specific TTL value, and specifies a label forwarding path of the check packet by using the label stack, so that the check packet can be sent to the to-be-checked network node according to the label stack. The value of TTL is decreased by 1 hop by hop. When the value of TTL in the check packet is 0 after being processed (subtracted by 1) by a next hop of the to-be-checked network node, that is, the feedback node, the feedback node is enabled to send the notification message to the network checking device. The network checking device can quickly determine, according to the notification message sent by the feedback node and the network topology information, whether the forwarding table of the to-be-checked network node is incorrect. Therefore, fault location efficiency is increased.

The notification message may be an Internet Control Message Protocol (ICMP) packet.

Optionally, the network checking device specifically determines, according to the destination IP address and the network topology information, the forwarding path from the network checking device to the destination IP address and the to-be-checked network node on the forwarding path; determines, according to the network topology information, the quantity (that is, N) of hops from the network checking device to the to-be-checked network node and a link label of each hop; and generates the check packet according to the quantity of hops from the network checking device to the to-be-checked network node and the link label of each hop. Therefore, when generating the check packet, the network checking device determines a value of N according to the to-be-checked network node. This ensures that the check packet is forwarded to the to-be-checked network node according to N link labels in the label stack, and route forwarding is performed at the to-be-checked network node. The network checking device can check whether the forwarding table of the to-be-checked network node is correct.

The network topology information may include the forwarding path from the network checking device to the destination IP address and route information of each hop. The route information includes a link label. The link label specifies a single-hop forwarding path for a packet.

Optionally, the feedback node receives the check packet forwarded by the to-be-checked network node, subtracts 1 from the value of TTL, and sends the notification message when the value of TTL in the check packet is 0.

When determining that the feedback node that sends the notification message is consistent with a route in the network topology information, the network checking device may determine that the forwarding table of the network node is correct. When determining that the feedback node that sends the notification message is inconsistent with the route in the network topology information, the network checking device may determine that the forwarding table of the network node is incorrect.

When the network checking device generates the check packet, the network checking device sets the value of TTL to a specific value, to ensure that the notification message is sent to the network checking device because the value of TTL is 0 when the check packet is processed by the next hop (that is, the feedback node) of the to-be-checked network node. Then, the network checking device may determine, according to the notification message and the network topology information, whether the forwarding table of the to-be-checked network node is correct.

A second aspect provides a method for checking a forwarding table, including: generating, by a network checking device, a check packet according to network topology information, where the check packet includes a label stack, TTL, a source IP address, and a destination IP address; where the label stack includes N link labels, a value of TTL is N+1, the source IP address is an IP address of the network checking device, N is a quantity of hops from the network checking device to a to-be-checked network node, and N≥1; and sending, by the network checking device, the check packet according to a topmost link label of the label stack, so that the check packet is sent to the to-be-checked network node according to the label stack. The to-be-checked network node receives the check packet, pops the topmost link label of the label stack, subtracts 1 from the value of TTL, determines that the label stack is empty, and forwards the check packet to a feedback node according to the destination IP address and a forwarding table of the to-be-checked network node. The feedback node receives the check packet, subtracts 1 from the value of TTL, determines that the value of TTL is 0, and sends a notification message to the network checking device. The network checking device receives the notification message, and determines, according to the notification message and the network topology information, whether the forwarding table of the to-be-checked network node is correct.

There may be one or more intermediate network nodes between the network checking device and the to-be-checked network node. The network checking device forwards the check packet to a next-hop node, that is, an intermediate network node according to the topmost link label of the label stack. The to-be-checked network node receives the check packet forwarded by a previous-hop node (an intermediate network node). Alternatively, the next-hop node of the network checking device may be the to-be-checked network node. That is, there is no intermediate network node between the network checking device and the to-be-checked network node. The network checking device sends the check packet to the to-be-checked network node according to the topmost link label of the label stack. The to-be-checked network node receives the check packet sent by the network checking device.

In this way, the network checking device generates a check packet that includes a specific label stack (N link labels) and a specific TTL value (the value is N+1), and specifies a label forwarding path of the check packet by using the label stack, so that the check packet can be sent to the to-be-checked network node according to the label stack.

The value of TTL is decreased by 1 hop by hop. When the value of TTL in the check packet is 0 after being processed (subtracted by 1) by the feedback node (that is, a next hop of the to-be-checked network node), the feedback node sends the notification message to the network checking device. The network checking device can check the forwarding table of the to-be-checked network node and quickly determine, according to the notification message and the network topology information, whether the forwarding table of the to-be-checked network node is incorrect. Therefore, fault location efficiency is increased.

The notification message may be an ICMP packet.

Optionally, the network checking device specifically determines, according to the destination IP address and the network topology information, a forwarding path from the network checking device to the destination IP address and the to-be-checked network node on the forwarding path; determines, according to the network topology information, the quantity N of hops from the network checking device to the to-be-checked network node and a link label of each hop; and generates the check packet according to the quantity N of hops from the network checking device to the to-be-checked network node and the link label of each hop. The network topology information may include the forwarding path from the network checking device to the destination IP address and route information of each hop. The route information includes a link label. The link label specifies a single-hop forwarding path for a packet.

In this way, if the network checking device checks different to-be-checked network nodes on the forwarding path, the network checking device may set N to different values and generate check packets with different values of N, to check whether forwarding tables of the different to-be-checked network nodes on a network path are correct.

When determining that the feedback node that sends the notification message is consistent with a route in the network topology information, the network checking device may determine that the forwarding table of the network node is correct. When determining that the feedback node that sends the notification message is inconsistent with the route in the network topology information, the network checking device may determine that the forwarding table of the network node is incorrect.

Optionally, there may be one or more intermediate network nodes between the network checking device and the to-be-checked network node, and the method further includes: receiving, by the intermediate network node, the check packet, popping the topmost link label of the label stack, and subtracting 1 from the value of TTL; determining, by the intermediate network node, that the label stack is not empty, and continuing to forward the check packet according to the topmost link label of the label stack until the to-be-checked network node receives the check packet. A specific label stack in the check packet is used to control the intermediate network node to forward the check packet only according to the link label. The check packet is forwarded on an IP route according to the forwarding table only when the to-be-checked network node determines that the label stack is empty.

A third aspect provides a network checking device. The network checking device has functions of the network checking device that implements the foregoing method for checking a forwarding table. The functions may be implemented by using the apparatus for checking a forwarding table. The apparatus for checking a forwarding table may be implemented by hardware, or may be implemented by hardware that executes corresponding software. The hardware or software may include one or multiple modules corresponding to the functions described above.

In a possible implementation of the third aspect, the apparatus includes a packet generation module, a sending module, a receiving module, and a determining module.

The packet generation module is configured to generate a check packet according to a destination IP address and network topology information, where the check packet includes a label stack, TTL, a source IP address, and the destination IP address; where the label stack includes N link labels, a value of TTL is N+1, the source IP address is an IP address of the network checking device, the destination IP address is a to-be-checked IP address, N is a quantity of hops from the network checking device to a to-be-checked network node, and N≥1.

The sending module is configured to send the check packet according to a topmost link label of the label stack, so that the check packet can be sent to the to-be-checked network node according to the label stack.

The receiving module is configured to receive a notification message, where the notification message is used to notify the network checking device that a feedback node has received the check packet forwarded by the to-be-checked network node, and the feedback node is a next-hop node of the to-be-checked network node. The network checking device usually receives the notification message from the feedback node.

The determining module is configured to determine, according to the notification message and the network topology information, whether a forwarding table of the to-be-checked network node is correct.

Optionally, the notification message is sent by the feedback node when the value of TTL in the check packet is 0. The notification message may be an ICMP packet.

Optionally, the packet generation module is specifically configured to determine, according to the destination IP address and the network topology information, a forwarding path from the network checking device to the destination IP address and the to-be-checked network node on the forwarding path; determines, according to the network topology information, the quantity of hops from the network checking device to the to-be-checked network node and a link label of each hop; and generates the check packet according to the quantity of hops from the network checking device to the to-be-checked network node and the link label of each hop.

Optionally, the apparatus further includes a topology obtaining module, configured to obtain the network topology information. The network topology information may include the forwarding path from the network checking device to the destination IP address and route information of each hop. The route information includes a link label. The link label specifies a single-hop forwarding path for a packet.

In another possible implementation of the third aspect, the network checking device includes a processor and a memory, and further includes a communications interface. The processor, the memory, and the communications interface are connected to each other by using a bus.

The memory is configured to store network topology information. The network topology information includes a forwarding path from a network checking device to a destination IP address and route information of each hop. The route information includes a link label. The link label specifies a single-hop forwarding path for a packet.

The processor is configured to generate a check packet according to the destination IP address and the network topology information, where the check packet includes a label stack, TTL, a source IP address, and the destination IP address; where the label stack includes N link labels, a value of TTL is N+1, the source IP address is an IP address of the network checking device, N is a quantity of hops from the network checking device to a to-be-checked network node, and N≥1; send the check packet according to a topmost link label of the label stack; receive a notification message, where the notification message is used to notify the network checking device that a feedback node has received the check packet forwarded by the to-be-checked network node; and determine, according to the notification message and the network topology information, whether a forwarding table of the to-be-checked network node is correct. The feedback node is a next-hop node of the to-be-checked network node. The network checking device usually receives the notification message from the feedback node.

The notification message is sent by the feedback node when the value of TTL in the check packet is 0.

Optionally, the processor is specifically configured to determine, according to the destination IP address and the network topology information, the forwarding path from the network checking device to the destination IP address and the to-be-checked network node on the forwarding path; determine, according to the network topology information, the quantity of hops from the network checking device to the to-be-checked network node and a link label of each hop; and generate the check packet according to the quantity of hops from the network checking device to the to-be-checked network node and the link label of each hop.

Optionally, the processor is further configured to obtain the network topology information.

A fourth aspect provides a network node. The network node has functions of the network node (including the to-be-checked network node, the intermediate network node, and the like) that implements the foregoing method for checking a forwarding table. The functions may be implemented by hardware, or may be implemented by hardware that executes corresponding software. The hardware or software may include one or multiple modules corresponding to the functions described above.

In a possible implementation, the network node includes a receiving module, a packet processing module, and a forwarding module.

The receiving module is configured to receive a check packet. The check packet includes a label stack, time to live TTL, a source Internet Protocol IP address, and a destination IP address. The label stack includes N link labels, N is a positive integer greater than or equal to 1 (may be denoted as N≥1), and the value of TTL is N+1.

The packet processing module is configured to pop a topmost link label of the label stack, subtract 1 from the value of TTL, and determine whether the label stack is empty.

The forwarding module is configured to, when the packet processing module determines that the label stack is empty, forward the check packet to a feedback node according to the destination IP address and a forwarding table of the network node. In this case, the network node is a to-be-checked network node, and the feedback node is a next-hop node of the to-be-checked network node.

The feedback node receives the check packet, subtracts 1 from the value of TTL, and sends a notification message to a network checking device when determining that the value of TTL is 0, so that the network checking device determines, according to the network topology information and an IP address of the feedback node in the notification message, whether the forwarding table of the network node is correct.

The forwarding module is further configured to, when the packet processing module determines that the label stack is not empty, forward the check packet according to the topmost link label of the label stack. In this case, the network node is an intermediate network node and continues to forward the check packet according to the label, so that the check packet is sent to the to-be-checked network node.

In another possible implementation, the network node includes a processor and a memory, and further includes a communications interface. The processor, the memory, and the communications interface are connected to each other by using a bus.

The memory is configured to store a forwarding table. The processor is configured to receive a check packet, where the check packet includes a label stack, TTL, a source IP address, and a destination IP address; the label stack includes N link labels, N≥1, and the value of TTL is N+1; and pop a topmost link label of the label stack, subtract 1 from the value of TTL, and determine whether the label stack is empty. When determining that the label stack is empty, the processor forwards the check packet to a feedback node according to the destination IP address and the forwarding table. In this case, the network node is a to-be-checked network node, and the feedback node is a next hop of the to-be-checked network node.

The feedback node receives the check packet, subtracts 1 from the value of TTL, determines that the value of TTL is 0, and sends a notification message to a network checking device, so that the network checking device determines, according to the network topology information and an IP address of the feedback node in the notification message, whether the forwarding table of the network node is correct.

The processor is further configured to, when determining that the label stack is not empty, forward the check packet according to the topmost link label of the label stack. In this case, the network node is an intermediate network node and continues to forward the check packet according to the label, so that the check packet is sent to the to-be-checked network node.

A fifth aspect provides a computer storage medium. The computer storage medium stores program code, and the program code includes instructions for implementing the foregoing method in the first aspect.

A sixth aspect provides a computer storage medium. The computer storage medium stores program code, and the program code includes instructions for implementing the foregoing method in the second aspect.

A seventh aspect provides a system for checking a forwarding table. The system includes a network checking device, a to-be-checked network node, and a feedback node.

The network checking device is configured to generate a check packet according to a destination IP address and network topology information, where the check packet includes a label stack, TTL, a source IP address, and the destination IP address; where the label stack includes N link labels, a value of TTL is N+1, the source IP address is an IP address of the network checking device, N is a quantity of hops from the network checking device to the to-be-checked network node, and N≥1; and send the check packet according to a topmost link label of the label stack, so that the check packet is sent to the to-be-checked network node.

The to-be-checked network node is configured to receive the check packet, pop the topmost link label of the label stack, and subtract 1 from the value of TTL; and when determining that the label stack is empty, forward the check packet to the feedback node according to the destination IP address and a forwarding table of the to-be-checked network node, where the feedback node is a next-hop node of the to-be-checked network node.

The feedback node is configured to receive the check packet, subtract 1 from the value of TTL, and send a notification message to the network checking device when determining that the value of TTL is 0.

The network checking device is further configured to receive the notification message, and determine, according to the notification message and the network topology information, whether the forwarding table of the to-be-checked network node is correct. Specifically, when determining that the feedback node that sends the notification message is consistent with a route in the network topology information, the network checking device may determine that the forwarding table of the network node is correct. When determining that the feedback node that sends the notification message is inconsistent with the route in the network topology information, the network checking device may determine that the forwarding table of the network node is incorrect.

Optionally, there may be one or more intermediate network nodes between the network checking device and the to-be-checked network node in the system for checking a forwarding table. Before the to-be-checked network node receives the check packet, the intermediate network node receives the check packet, pops the topmost link label of the label stack, and subtracts 1 from the value of TTL. The intermediate network node determines that the label stack is not empty, and continues to forward the check packet according to the topmost link label of the label stack until the to-be-checked network node receives the check packet. In this way, a specific label stack and a specific TTL value in the check packet are used to control the intermediate network node to forward the check packet only according to the link label, so that the check packet is sent to the to-be-checked network node, and the check packet is forwarded on an IP route according to the forwarding table only when the to-be-checked network node determines that the label stack is empty.

In the technical solutions provided in this application, when a data packet destined for a to-be-checked IP address is lost or incorrectly forwarded, and the forwarding table of the to-be-checked network node needs to be checked, the network checking device generates a check packet that includes a specific label stack and a specific TTL value, and specifies a forwarding path of the check packet. The value of TTL is decreased by 1 hop by hop. When the value of TTL is 0, a next hop of the to-be-checked network node, that is, the feedback node, is enabled to send the notification message (ICMP packet) to the network checking device. The network checking device can quickly determine whether the forwarding table of the to-be-checked network node is incorrect. Therefore, fault location efficiency is increased.

BRIEF DESCRIPTION OF DRAWINGS

FIG. 1 is a schematic diagram of a structure of a system for checking a forwarding table according to an embodiment of this application;

FIG. 2 is a schematic flowchart of a method for checking a forwarding table according to an embodiment of this application;

DESCRIPTION OF EMBODIMENTS

Figure 3A:
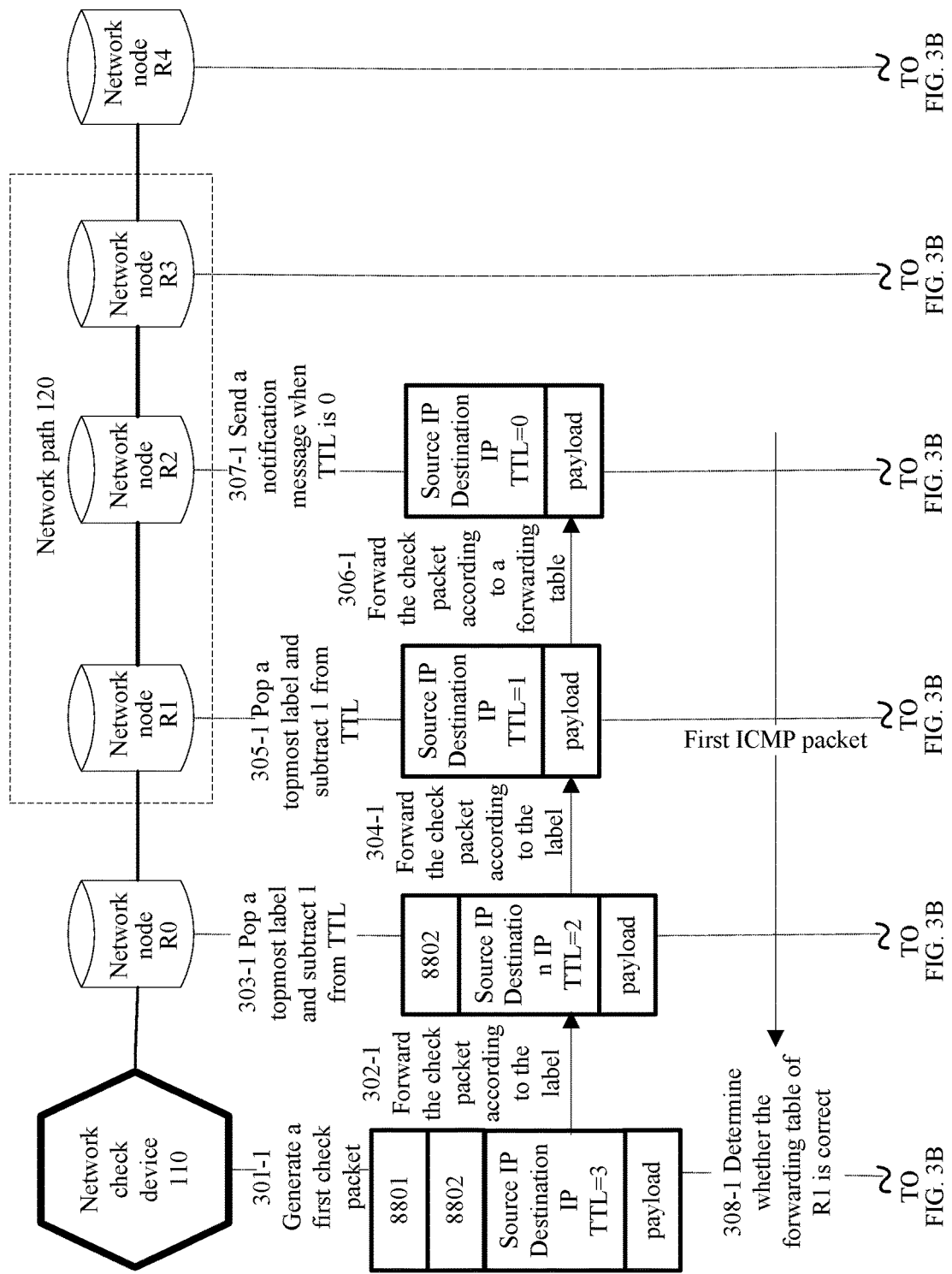
FIG. 3A, FIG. 3B, and FIG. 3C are a schematic diagram of information exchange in a method for checking a forwarding table according to an embodiment of this application.

In the technical solutions provided in this application, a network checking device generates a check packet that includes TTL and a link label, specifies a label forwarding path of the check packet by using a label stack, specifies a quantity of hops through which the check packet passes by using TTL, and checks whether a forwarding table of a to-be-checked network node on a forwarding path from the network checking device to a destination IP address is correct. Specifically, the network checking device determines the quantity N of hops from the network checking device to the to-be-checked network node and a link label of each hop according to network topology information, and generates the check packet. The check packet includes the label stack and TTL, the label stack includes N link labels (sequential link labels of N hops), and a value of TTL is 1 added to N, that is, N+1. In a process in which the check packet is forwarded from the network checking device to the to-be-checked network node, the check packet is forwarded according to the link label in the label stack. After the check packet arrives at the to-be-checked network node and the label stack is empty, the check packet is forwarded according to the forwarding table of the to-be-checked network node. A next hop of the to-be-checked network node, which is also referred to as a feedback node, receives the check packet, and subtracts 1 from the value of TTL. As a result, a notification message, such as an ICMP packet, is sent to the network checking device because the value of TTL is 0 in the check packet. In this way, the network checking device determines, according to the received ICMP packet and the network topology information, whether the forwarding table, that is, FIB of the to-be-checked network node is incorrect.

ICMP is used to transfer control information, including a reported error and status information, between a host and a router. There are different types of ICMP packets. For example, an ICMP error report packet is mainly used to report an error to a source end during data communication. A data area of the ICMP error report packet may generally include a header of an erroneous packet, and may further include first 64 bits of data in the erroneous packet. When TTL in a data packet is 0, the router discards the data packet, and sends an ICMP error report packet of a timeout type (type value is 11 and a code is 0) to a sender (a source end) of the data packet. In the embodiments of this application, the notification message may be an ICMP packet, that is, the ICMP error report packet whose type value is 11 and code is 0.

When anomalies occur, for example, a data packet destined for a destination IP address is lost or incorrect, but a network is normal or not faulty (for example, no link fault) in other words, a method for checking a forwarding table provided in the embodiments of this application is used to check whether a forwarding table of a network node on a forwarding path to the destination IP address is incorrect. Certainly, this method may also be used to check whether a forwarding table of a network node on a forwarding path destined for a destination IP address is incorrect according to a user requirement at any time. In the embodiments of this application, the destination IP address is also referred to as a to-be-checked IP address.

There are usually multiple network nodes on the forwarding path and the network checking device does not know which network node has an incorrect forwarding table. In this case, the network checking device may sequentially use the multiple network nodes on a network path that is a portion of the forwarding path as a to-be-checked network node and send multiple check packets that have ascending or descending values of TTL and an ascending or descending quantity of link labels, to enable the multiple network nodes on the network path to feed back an ICMP packet when TTL is 0. In this way, the network checking device can check whether a forwarding table of each hop of network node on the network path is correct. The method for checking a forwarding table provided in this application may locate a network node that has an incorrect forwarding table by checking the multiple network nodes on the network path. This increases fault location efficiency.

The following describes in detail the technical solutions of this application with reference to accompanying drawings and specific implementations.

FIG. 1 is a schematic diagram of a structure of a system for checking a forwarding table according to an embodiment of this application. The system 100 includes a network checking device 110 and a network path 120 that is a portion of a forwarding path from the network checking device to a destination IP address. The network path 120 shown in FIG. 1 includes three network nodes: R1, R2, and R3. The network checking device 110 may check a forwarding table of any network node on the network path 120, or may sequentially check a forwarding table of each network node on the network path 120. The system 100 may further include other network nodes, such as network nodes R0 and R4 shown in FIG. 1.

In the embodiment of this application, a network node that the network checking device prepares to check is referred to as a to-be-checked network node, and a next hop of the to-be-checked network node is referred to as a feedback node. A network node on the forwarding path between the network checking device and the to-be-checked network node is referred to as an intermediate network node. With reference to the system shown in FIG. 1, when the network checking device 110 checks a forwarding table of the network node R1, the network node R1 is a to-be-checked network node. If the forwarding table of the network node R1 is correct, a feedback node that sends a notification message is consistent with a route in network topology information. If the forwarding table of the network node R1 is incorrect, the feedback node that sends the notification message is inconsistent with the network topology information. For example, a next hop of the network node R1 is the network node R2 in the network topology information. If the network checking device receives a notification message sent by the network node R2, the feedback node is consistent with the network topology information and it may be determined that the forwarding table of the network node R1 is correct. If the network checking device receives a notification message sent by a node other than the network node R2, the feedback node is inconsistent with the network topology information and it may be determined that the forwarding table of R1 is incorrect.

FIG. 2 is a schematic flowchart of a method for checking a forwarding table according to an embodiment of this application. The method may be used to check whether a forwarding table of any network node on a network path is correct. The method includes the following steps.

201. A network checking device generates a check packet according to a destination IP address and network topology information, where the check packet includes a label stack, TTL, a source IP address, and the destination IP address; where the label stack includes N link labels, a value of TTL is N+1, N is a quantity of hops from the network checking device to a to-be-checked network node, and N≥1.

The source IP address is an IP address of the network checking device, for example, 1.1.1.1. The destination IP address is usually an IP address of a host, for example, 192.168.1.1.

Specifically, the network checking device determines, according to the destination IP address and the network topology information, a forwarding path from the network checking device to the destination IP address and the to-be-checked network node on the forwarding path. Then, the network checking device determines, according to the network topology information, the quantity of hops from the network checking device to the to-be-checked network node and a link label of each hop, and generates the check packet. The network topology information includes the forwarding path from the network checking device to the destination IP address, and route information of each hop on the forwarding path. The route information includes a link label. The link label specifies a single-hop forwarding path for a packet.

In the embodiment of this application, the network checking device may first obtain the network topology information by using a network topology management apparatus. The network topology management apparatus may be a software-defined networking (SDN) controller. During specific implementation, the network checking device and the network topology management apparatus may be implemented on a same physical device or different physical devices.

The system shown in FIG. 1 is used as an example. The network checking device 110 checks whether the forwarding table of the network node R1 on a forwarding path destined for a destination IP address 192.168.1.1 on a network is correct. That is, a to-be-checked network node is R1. The network checking device 110 determines, according to the network topology information, that a quantity of hops from the network checking device 110 to the network node R1 is 2 (that is, two hops in total from the network checking device 110 to R0, and from R0 to R1). Link labels are 8801 and 8802. The network checking device 110 generates a check packet with a label stack including two link labels 8801 and 8802 and a value of TTL being 3.

202. The network checking device sends the check packet according to a topmost link label of the label stack.

An operation of the label stack is generally the same as a "last in first out" operation of a stack. Pushing a label into a stack refers to adding a label to a packet and increasing a depth of the label stack by 1. Pulling a label from a stack refers to removing a label from a packet. In other words, the label is popped and a depth of the label stack is decreased by 1. Labels in the packet are encapsulated from the bottom to the top of the stack in an internal-to-external sequence. During packet forwarding, a topmost label of the label stack, that is, an outermost label of the packet, always determines how to forward the packet.

Specifically, the network checking device may use a label forwarding manner defined in Multiprotocol Label Switching, MPLS for short, to implement the method for checking a forwarding table in this application. The check packet may be an MPLS packet. Certainly, another link label forwarding manner that supports segment routing may be used. This is not limited in this application.

Specifically, the network checking device sends the check packet to a next-hop node (which may be an intermediate network node or the to-be-checked network node), so that the check packet is sent to the to-be-checked network node. The example in the step 201 is also used herein. In the check packet generated by the network checking device 110, the link labels from the bottom to the top of the label stack (from internal to external) are 8802 and 8801, and the value of TTL is 3. The network checking device 110 sends the check packet to the next-hop node, that is, the network node R0, according to the topmost link label 8801 of the label stack.

203. A network node receives the check packet, pops the topmost link label of the label stack, and subtracts 1 from the value of TTL.

204. The network node determines whether the label stack is empty.

After popping the topmost link label of the label stack, the network node needs to determine whether the label stack is empty and whether to continue to forward the check packet according to the label or to forward the check packet on an IP route according to the forwarding table.

When the network node determines that the label stack is not empty and it indicates that the network node is an intermediate network node, the network node proceeds to step 205. When the network node determines that the label stack is empty and it indicates that the network node is the to-be-checked network node, the network node proceeds to step 206.

205. When determining that the label stack is not empty, the network node forwards the check packet according to the topmost link label of the label stack.

When the network node determines that the label stack is not empty, that is, the network node is an intermediate network node, the network node forwards the check packet to a next-hop node according to the topmost link label of the label stack, so that the check packet is sent to the to-be-checked network node. The foregoing example is also used herein. The network node R0 determines that the label stack is not empty and forwards the check packet according to the topmost link label 8802 of the label stack to the next-hop node, that is, the network node R1.

206. When determining that the label stack is empty, the network node forwards the check packet to a feedback node according to the destination IP address and a forwarding table of the network node.

When the network node determines that the label stack is empty, the network node is the to-be-checked network node. It should be understood that the value of TTL in the check packet is 1 in this case. The network node forwards the check packet to the feedback node according to the destination IP address and the forwarding table of the network node. The feedback node is a next-hop node of the to-be-checked network node. The foregoing example is also used herein. The network node R1 determines that the label stack is empty and forwards the check packet to the feedback node, that is, the network node R2 according to the destination IP address and the forwarding table of the network node R1.

207. The feedback node receives the check packet, subtracts 1 from the value of TTL, and sends a notification message to the network checking device when determining that the value of TTL is 0.

The notification message is used to notify the network checking device that the feedback node has received the check packet forwarded by the to-be-checked network node. The notification message includes an IP address of the feedback node.

The notification message may be specifically an ICMP packet. Certainly, an existing message may be expanded or a new message may be created as long as a function of the notification message is applied. This is not limited in this application.

The feedback node receives the check packet, subtracts 1 from the value of TTL, and the value of TTL is 0. Therefore, the feedback node sends the notification message to the network checking device to notify the network checking device that the feedback node has received the check packet. In the embodiment of this application, because the label stack and the value of TTL are set, the check packet generated by the network checking device is forwarded hop by hop to the to-be-checked network node according to the link label, and the label stack is empty and the value of TTL is 1 after the check packet is processed by the to-be-checked network node. After the check packet is processed by the feedback node (1 is subtracted from the value of TTL) and the value of TTL is 0, the feedback node is enabled to send the notification message to the network checking device.

208. The network checking device receives the notification message, and determines, according to the notification message and the network topology information, whether the forwarding table of the network node is correct.

Specifically, when determining that the feedback node that sends the notification message is consistent with a route in the network topology information, the network checking device may determine that the forwarding table of the network node is correct. When determining that the feedback node that sends the notification message is inconsistent with the route in the network topology information, the network checking device may determine that the forwarding table of the network node is incorrect.

In the technical solution provided in this application, the check packet is forwarded according to the label and then forwarded on an IP route according to the forwarding table of the to-be-checked network node. Because the value of TTL is decreased by 1 every time the check packet passes through a hop, an appropriate value of TTL is set, so that the value of TTL is 0 after being processed by the feedback node (1 is subtracted from the value of TTL), and the feedback node is enabled to send the ICMP packet to the network checking device. If the feedback node that sends the ICMP packet is consistent with the route in the network topology information, it may be determined that the forwarding table of the to-be-checked network node is correct. If the feedback node that sends the ICMP packet is inconsistent with the route in the network topology information, it may be determined that the forwarding table of the to-be-checked network node is incorrect.

The ICMP packet includes a header of the check packet, and therefore the network checking device may determine that the received ICMP packet is used by the feedback node to report a check packet timeout error (the value of TTL is 0).

When the network checking device needs to check forwarding tables of multiple network nodes on the forwarding path, the network checking device may sequentially send multiple check packets that have ascending or descending values of TTL and an ascending or descending quantity of link labels, and may repeatedly execute the method for the check packet shown in FIG. 2, to check the forwarding tables of the multiple network nodes on the forwarding path and locate a network node with an incorrect forwarding table.

With reference to the system shown in FIG. 1, the embodiment of this application provides a method for sequentially checking forwarding tables of the three network nodes R1, R2, and R3 on the network path 120 that is a portion of the forwarding path from the network checking device 110 to the destination IP address. The network path 120 may be determined by means of analysis according to a customer requirement, a network deployment status (weight, bandwidth, or the like), or a data packet forwarding exception. Referring to a schematic diagram of information exchange in the method for checking a forwarding table shown in FIG. 3A, FIG. 3B, and FIG. 3C, the method includes the following steps.

301-1. The network checking device 110 generates a first check packet according to the destination IP address and the network topology information, where a header of the first check packet includes a first label stack, first TTL, the source IP address, and the destination IP address.

Specifically, the network checking device 110 determines, according to the destination IP address and the network topology information, the forwarding path from the network checking device to the destination IP address and the network path 120 of the forwarding path.

The network checking device 110 first checks whether the forwarding table of the network node R1 on the network path 120 is incorrect. That is, the network node R1 is a to-be-checked network node.

Figure 3B:
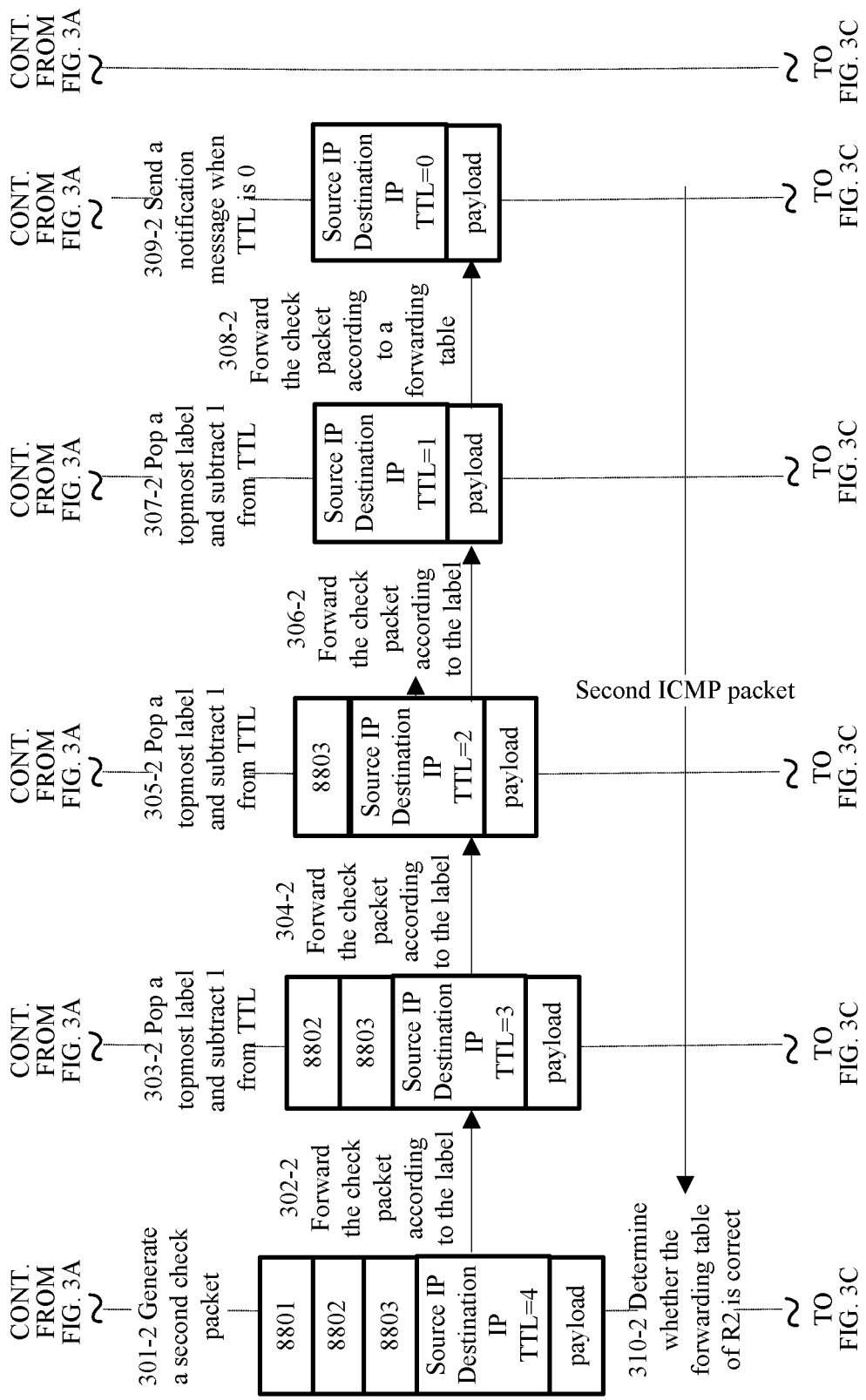
Figure 3C:
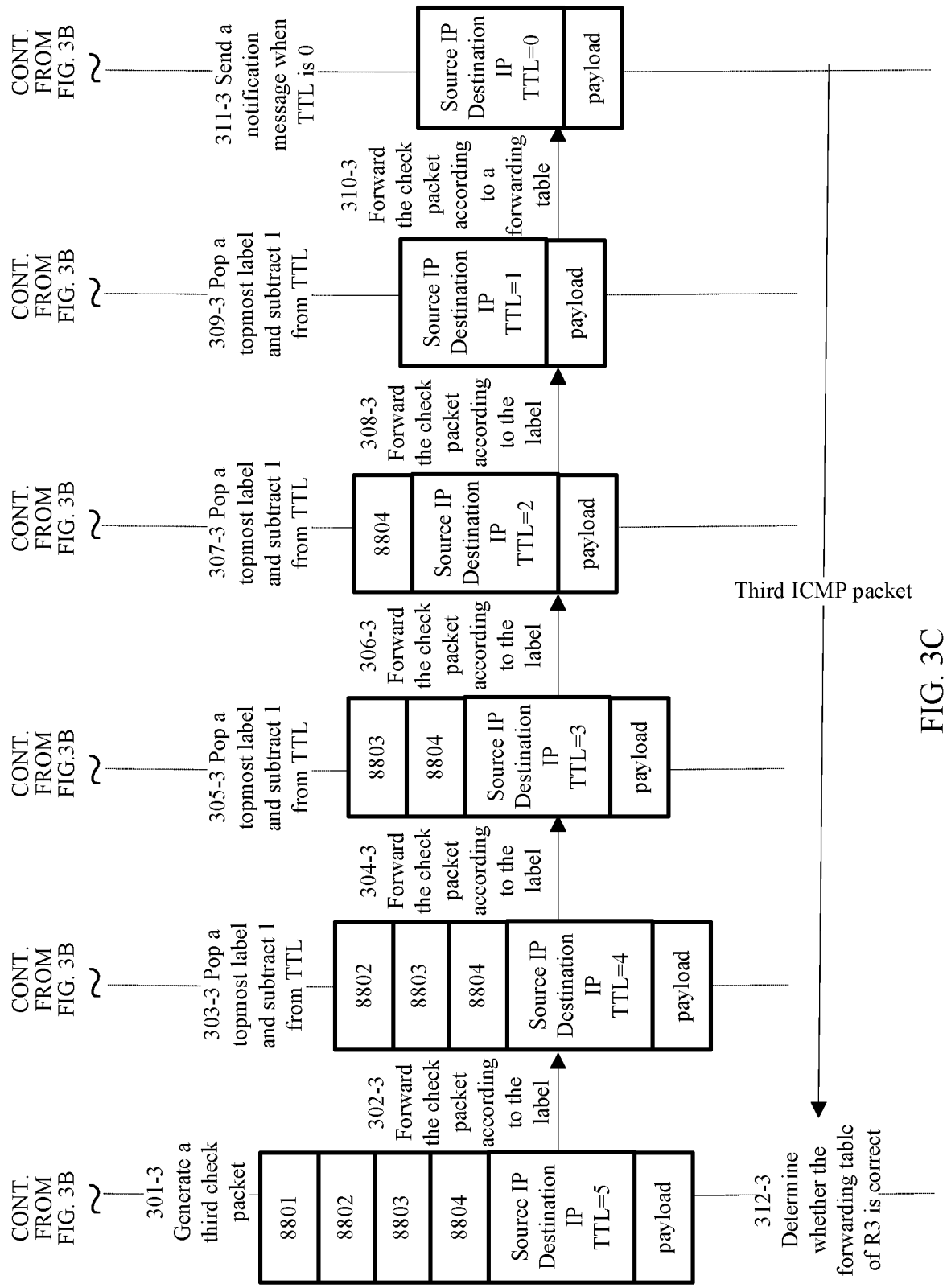

The network checking device 110 determines, according to the network topology information, that a quantity of hops from the network checking device 110 to the network node R1 is 2 (that is, two hops in total from the network checking device 110 to the network node R0, and from the network node R0 to the network node R1). Link labels are 8801 and 8802. The network checking device 110 generates the first check packet and N is 2. As shown in FIG. 3A, FIG. 3B, and FIG. 3C, the first label stack includes two link labels from the bottom to the top of the label stack (from internal to external): a second link label 8802 and a first link label 8801. The value of first TTL is 3.

The destination IP address, that is, a to-be-checked IP address, is 192.168.1.1 for example. The source IP address is the IP address of the network checking device 110, for example, 1.1.1.1.

302-1. The network checking device 110 sends the first check packet according to the topmost first link label (8801) of the first label stack.

Specifically, the network node R0 is a next-hop node of the network checking device on the forwarding path. The network checking device 110 sends the first check packet to the network node R0 according to the topmost first link label 8801 of the first label stack.

303-1. The network node R0 receives the first check packet, pops the topmost first link label (8801) of the first label stack, and subtracts 1 from the value of first TTL.

After the first check packet is processed by the network node R0, the first label stack includes one link label, that is, the second link label 8802, and the value of first TTL is 2. In this case, the topmost label of the first label stack is the second link label 8802.

Then, the network node R0 needs to determine whether the first label stack is empty, to determine whether to continue to forward the first check packet according to the label or forward the first check packet on an IP route according to the forwarding table.

304-1. The network node R0 determines that the first label stack is not empty, and sends the first check packet to the network node R1 according to the topmost second link label (8802) of the first label stack.

If the network node R0 determines that the first label stack is not empty, it indicates that the network node R0 is an intermediate network node. The network node R0 continues to forward the first check packet to its next hop node, that is, the network node R1.

305-1. The network node R1 receives the first check packet, pops the topmost second link label (8802) of the first label stack, and subtracts 1 from the value of first TTL.

After the first check packet is processed by the network node R1, the first label stack is empty (there is no link label), and the value of first TTL is 1.

Then, the network node R1 needs to determine whether the first label stack is empty, to determine whether to continue to forward the first check packet according to the label or forward the first check packet on an IP route according to the forwarding table.

306-1. The network node R1 determines that the first label stack is empty, and forwards the first check packet to the network node R2 according to the destination IP address and the forwarding table of the network node R1.

If the network node R1 determines that the first label stack is empty, it indicates that the network node R1 is the to-be-checked network node. The network node R1 forwards the first check packet on an IP route according to the destination IP address and the forwarding table of the network node R1, and forwards the first check packet to a next hop of the network node R1, that is, the feedback node.

307-1. The network node R2 receives the first check packet, subtracts 1 from the value of first TTL, determines that the value of first TTL is 0, and sends a first ICMP packet to the network checking device 110.

If the network node R2 determines that the value of first TTL is 0, the network node R2, as the feedback node, generates the first ICMP packet, and sends it to the network checking device 110. The first ICMP packet includes an IP address of the network node R2. The first ICMP packet carries a header (the source IP address and the destination IP address) of the first check packet. Therefore, the network checking device may determine that the received first ICMP packet is used by the network node R2 to report a first check packet timeout error (the value of TTL is 0).

It is assumed that the next hop of the network node R1 on the forwarding path from the network checking device to the destination IP address in the network topology information is the network node R2. If the network node R2 receives the first check packet and sends the first ICMP packet to the network checking device, that is, the network node R2 is the feedback node, it indicates that the forwarding table of the to-be-checked network node, that is, the network node R1 is correct. If another node different from the network node R2 receives the first check packet, the another node sends the first ICMP packet to the network checking device, that is, the another node is the feedback node (not shown in FIG. 3A, FIG. 3B, and FIG. 3C), it indicates that the forwarding table of the network node R1 is incorrect.

308-1. The network checking device 110 receives the first ICMP packet sent by the network node R2, and determines, according to the first ICMP packet and the network topology information, whether the forwarding table of the network node R1 is correct.

Specifically, the network checking device determines, according to the network topology information and the IP address of the network node R2 in the first ICMP packet, whether the forwarding table is correct. If determining that the next hop of the network node R1 (that is, the to-be-checked network node) on the forwarding path from the network checking device to the destination IP address in the network topology information is the network node R2, that is, the feedback node (the network node R2) that sends the first ICMP packet is consistent with the network topology information, the network checking device may determine that the forwarding table of the network node R1 is correct. If determining that the next hop of the network node R1 on the forwarding path in the network topology information is not the network node R2, that is, the feedback node (the network node R2) that sends the first ICMP packet is inconsistent with the network topology information, the network checking device may determine that the forwarding table of the network node R1 is incorrect.

Then, the network checking device 110 needs to continue to check whether a forwarding table of the network node R2 on the network path 120 is incorrect.

301-2. The network checking device 110 generates a second check packet according to the destination IP address and the network topology information, where the second check packet includes a second label stack, second TTL, the source IP address, and the destination IP address.

Specifically, the network checking device 110 determines, according to the destination IP address and the network topology information, that a quantity of hops from the network checking device 110 to the network node R2 (a to-be-checked network node) is 3 (that is, three hops in total from the network checking device 110 to the network node R0, from the network node R0 to the network node R1, and from the network node R1 to the network node R2). Link labels are 8801, 8802, and 8803. The network checking device 110 generates the second check packet and N is 3. As shown in FIG. 3A, FIG. 3B, and FIG. 3C, the second label stack includes three link labels from the bottom to the top of the label stack (from internal to external): a third link label 8803, a second link label 8802, and a first link label 8801. The value of second TTL is 4.

The second check packet and the first check packet have the same source IP address and the same destination IP address.

302-2. The network checking device 110 sends the second check packet according to the topmost first link label (8801) of the second label stack.

Specifically, the network checking device 110 sends the second check packet to the next-hop node, that is, the network node R0, according to the topmost first link label 8801 of the second label stack.

303-2. The network node R0 receives the second check packet, pops the topmost first link label (8801) of the second label stack, and subtracts 1 from the value of second TTL.

After the second check packet is processed by the network node R0, the second label stack includes two link labels from the bottom to the top of the label stack (from internal to external): the third link label 8803 and the second link label 8802. The value of second TTL is 3. In this case, the topmost label of the second label stack is the second link label 8802.

Then, the network node R0 needs to determine whether the second label stack is empty, to determine whether to continue to forward the second check packet according to the label or forward the second check packet on an IP route according to the forwarding table.

304-2. The network node R0 determines that the second label stack is not empty, and sends the second check packet to the network node R1 according to the topmost second link label (8802) of the second label stack.

If the network node R0 determines that the second label stack is not empty, it indicates that the network node R0 is an intermediate network node. The network node R0 continues to forward the second check packet to its next hop node, that is, the network node R1 according to the topmost second link label (8802) of the label stack.

305-2. The network node R1 receives the second check packet, pops the topmost second link label (8802) of the second label stack, and subtracts 1 from the value of second TTL.

After the second check packet is processed by the network node R1, the second label stack includes one link label, that is, the third link label 8803, and the value of second TTL is 2. In this case, the topmost label of the second label stack is the third link label 8803.

Then, the network node R1 needs to determine whether the second label stack is empty, to determine whether to continue to forward the second check packet according to the label or forward the second check packet on an IP route according to the forwarding table.

306-2. The network node R1 determines that the second label stack is not empty, and sends the second check packet to the network node R2 according to the topmost third link label (8803) of the second label stack.

If the network node R1 determines that the second label stack is not empty, it indicates that the network node R1 is also an intermediate network node. The network node R1 continues to forward the second check packet to its next hop node, that is, the network node R2 according to the topmost third link label (8803) of the second label stack.

307-2. The network node R2 receives the second check packet, pops the topmost third link label (8803) of the second label stack, and subtracts 1 from the value of second TTL.

After the second check packet is processed by the network node R2, the second label stack is empty and the value of second TTL is 1.

Then, the network node R2 needs to determine whether the second label stack is empty, to determine whether to continue to forward the second check packet according to the label or forward the second check packet on an IP route according to the forwarding table.

308-2. The network node R2 determines that the second label stack is empty, and forwards the second check packet to the network node R3 according to the destination IP address and the forwarding table of the network node R2.

If the network node R2 determines that the second label stack is empty, it indicates that the network node R2 is the to-be-checked network node. The network node R2 forwards the second check packet on an IP route according to its forwarding table and the destination IP address, and forwards the second check packet to its next hop, that is, a feedback node.

309-2. The network node R3 receives the second check packet, subtracts 1 from the value of second TTL, determines that the value of second TTL is 0, and sends a second ICMP packet to the network checking device.

The network node R3, that is, the feedback node, receives the second check packet and subtracts 1 from the value of second TTL. If the network node R3 determines that the value of second TTL is 0, the network node R3 generates the second ICMP packet and sends it to the network checking device 110. The second ICMP packet includes an IP address of the network node R3. The second ICMP packet further carries a header (the source IP address and the destination IP address) of the second check packet. Therefore, the network checking device may determine that the received second ICMP packet is used by the network node R3 to report a second check packet timeout error (the value of TTL is 0).

310-2. The network checking device 110 receives the second ICMP packet sent by the network node R3, and determines, according to the second ICMP packet and the network topology information, whether the forwarding table of the network node R2 is correct.

Specifically, the network checking device determines, according to the network topology information and the IP address of the network node R3 in the second ICMP packet, whether the forwarding table is correct. If determining that the next hop of the network node R2 (that is, the to-be-checked network node) on the forwarding path from the network checking device to the destination IP address in the network topology information is the network node R3, that is, the feedback node (the network node R3) that sends the second ICMP packet is consistent with the network topology information, the network checking device may determine that the forwarding table of the network node R2 is correct. If determining that the next hop of the network node R2 on the forwarding path in the network topology information is not the network node R3, that is, the feedback node (the network node R3) that sends the second ICMP packet is inconsistent with the network topology information, the network checking device may determine that the forwarding table of the network node R2 is incorrect.

Then, the network checking device 110 continues to check whether a forwarding table of the network node R3 on the network path 120 is incorrect.

301-3. The network checking device 110 generates a third check packet according to the destination IP address and the network topology information, where the third check packet includes a third label stack, third TTL, the source IP address, and the destination IP address.

Specifically, the network checking device 110 determines, according to the network topology information, that a quantity of hops from the network checking device 110 to the network node R3 (a to-be-checked network node) is 4 (that is, four hops in total from the network checking device 110 to the network node R0, from the network node R0 to the network node R1, from the network node R1 to the network node R2, and from the network node R2 to the network node R3). Link labels are 8801, 8802, 8803, and 8804. The network checking device 110 generates the third check packet and N is 4. As shown in FIG. 3A, FIG. 3B, and FIG. 3C, the third label stack includes four link labels from the bottom to the top of the label stack (from internal to external): a fourth link label 8804, a third link label 8803, a second link label 8802, and a first link label 8801. The value of third TTL is 5.

The third check packet, the first check packet, and the second check packet have the same source IP address (that is, the IP address of the network checking device) and the same destination IP address (that is, the to-be-checked IP address).

302-3. The network checking device 110 sends the third check packet to the network node R0 according to the topmost first link label (8801) of the third label stack.

303-3. The network node R0 receives the third check packet, pops the topmost first link label (8801) of the third label stack, and subtracts 1 from the value of third TTL.

After the third check packet is processed by the network node R0, the third label stack includes three link labels from the bottom to the top of the label stack (from internal to external): the fourth link label 8804, the third link label 8803, and the second link label 8802. The value of third TTL is 4. In this case, the topmost label of the third label stack is the second link label 8802.

Then, the network node R0 needs to determine whether the third label stack is empty, to determine whether to continue to forward the third check packet according to the label or forward the third check packet on an IP route according to the forwarding table.

304-3. The network node R0 determines that the third label stack is not empty, and sends the third check packet to the network node R1 according to the topmost second link label (8802) of the third label stack.

The network node R0, as an intermediate network node, continues to forward the third check packet to its next hop node, that is, the network node R1.

305-3. The network node R1 receives the third check packet, pops the topmost second link label (8802) of the third label stack, and subtracts 1 from the value of third TTL.

After the third check packet is processed by the network node R1, the third label stack includes two link labels from the bottom to the top of the label stack (from internal to external): the fourth link label 8804 and the third link label 8803. The value of third TTL is 3. In this case, the topmost label of the third label stack is the third link label 8803.

Then, the network node R1 needs to determine whether the third label stack is empty, to determine whether to continue to forward the third check packet according to the label or forward the third check packet on an IP route according to the forwarding table.

306-3. The network node R1 determines that the third label stack is not empty, and sends the third check packet to the network node R2 according to the topmost third link label (8803) of the third label stack.

The network node R1, as an intermediate network node, continues to forward the third check packet to its next hop node, that is, the network node R2.

307-3. The network node R2 receives the third check packet, pops the topmost third link label (8803) of the third label stack, and subtracts 1 from the value of third TTL.

After the third check packet is processed by the network node R2, the third label stack includes one link label, that is, the fourth link label 8804, and the value of third TTL is 2. In this case, the topmost label of the third label stack is the fourth link label 8804.

Then, the network node R2 needs to determine whether the third label stack is empty, to determine whether to continue to forward the third check packet according to the label or forward the third check packet on an IP route according to the forwarding table.

308-3. The network node R2 determines that the third label stack is not empty, and sends the third check packet to the network node R3 according to the topmost fourth link label (8804) of the third label stack.

The network node R2, as an intermediate network node, continues to forward the third check packet to its next hop node, that is, the network node R3.

309-3. The network node R3 receives the third check packet, pops the topmost fourth link label (8804) of the third label stack, and subtracts 1 from the value of third TTL.

After the third check packet is processed by the network node R3, the third label stack is empty and the value of third TTL is 1.

Then, the network node R3 needs to determine whether the third label stack is empty, to determine whether to continue to forward the third check packet according to the label or forward the third check packet on an IP route according to the forwarding table.

310-3. The network node R3 determines that the third label stack is empty, and forwards the third check packet to the network node R4 according to the destination IP address and the forwarding table of the network node R3.

If the network node R3 determines that the third label stack is empty, it indicates that the network node R3 is the to-be-checked network node. The network node R3 forwards the third check packet on an IP route according to the destination IP address and the forwarding table of the network node R3, and forwards the third check packet to a next hop of the network node R3, that is, a feedback node.

311-3. The network node R4 receives the third check packet, subtracts 1 from the value of third TTL, determines that the value of third TTL is 0, and sends a third ICMP packet to the network checking device.

If the network node R4 determines that the value of third TTL is 0, the network node R4, as the next-hop node of the to-be-checked network node, that is, the feedback node, generates the third ICMP packet, and sends it to the network checking device 110. The third ICMP packet includes an IP address of the network node R4. The third ICMP packet further includes a header of the third check packet, and therefore the network checking device may determine that the received third ICMP packet is used by the network node R2 to report a third check packet timeout error (the value of TTL is 0).

It is assumed that the next hop of the network node R3 on the forwarding path in the network topology information is the network node R4. If the network node R4 receives the third check packet and sends the third ICMP packet to the network checking device, that is, the network node R4 is the feedback node, it indicates that the forwarding table of the to-be-checked network node, that is, the network node R3 is correct. If another node different from the network node R4 receives the third check packet, the another node sends the third ICMP packet to the network checking device, that is, the another node is the feedback node (not shown in FIG. 3A, FIG. 3B, and FIG. 3C), it indicates that the forwarding table of the network node R3 is incorrect.

312-3. The network checking device 110 receives the third ICMP packet sent by the network node R4, and determines, according to the third ICMP packet and the network topology information, whether the forwarding table of the network node R3 is correct.

Specifically, the network checking device determines, according to the network topology information and the IP address of the network node R4 in the third ICMP packet, whether the forwarding table is correct. If determining that the next hop, on the network path, of the network node R3 (that is, the to-be-checked network node) on the forwarding path from the network checking device to the destination IP address in the network topology information is the network node R4, that is, the feedback node (the network node R4) that sends the third ICMP packet is consistent with the network topology information, the network checking device may determine that the forwarding table of the network node R3 is correct. If determining that the next hop of the network node R3 on the forwarding path in the network topology information is not the network node R4, that is, the feedback node (the network node R4) that sends the third ICMP packet is inconsistent with the network topology information, the network checking device may determine that the forwarding table of the network node R3 is incorrect, that is, has an error.

In the method for checking a forwarding table in the embodiment of this application, the network checking device generates, according to network topology information, a check packet that includes a specific link label and a specific TTL value, to specify a forwarding path of the check packet. The value of TTL is decreased by 1 hop by hop. When the value of TTL is 0, a next hop of a to-be-checked node, that is, a feedback node, is triggered (enabled) to send a notification message (ICMP packet) to the network checking device. This method may check whether forwarding tables of any one or more network nodes on a network path destined for a to-be-checked IP address are incorrect. Therefore, fault location efficiency is increased.

In a process of checking the forwarding table shown in FIG. 3A, FIG. 3B, and FIG. 3C, whether a forwarding table of each node is correct may be sequentially checked according to a sequence of the nodes on the network path 120 of the forwarding path, or certainly may be checked in a reverse sequence, or any one or more network nodes may be selected to check whether the forwarding table is correct. This is not limited in this application.

On a basis of the method for checking a forwarding table provided in the embodiment shown in FIG. 2, FIG. 3A, FIG. 3B, and FIG. 3C of this application, the following describes in detail an apparatus for checking a forwarding table and a network checking device that provide functions of the network checking device.

Figure 4:
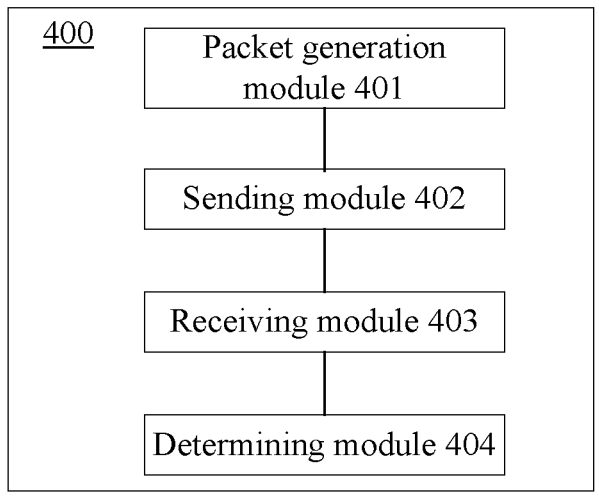
FIG. 4 is a schematic diagram of a structure of an apparatus for checking a forwarding table according to an embodiment of this application.

Referring to FIG. 4, FIG. 4 shows an apparatus 400 for checking a forwarding table according to an embodiment of this application. The apparatus 400 may be disposed on the network checking device, and is configured to implement the method for checking a forwarding table in the embodiment shown in FIG. 2, FIG. 3A, FIG. 3B, and FIG. 3C of this application. The apparatus 400 includes:

a packet generation module 401, configured to generate a check packet according to a destination IP address and network topology information, where the check packet includes a label stack, TTL, a source IP address, and the destination IP address; where the label stack includes N link labels, a value of TTL is N+1, the source IP address is an IP address of the network checking device, N is a quantity of hops from the network checking device to a to-be-checked network node, and N is a positive integer greater than or equal to 1 (may be denoted as N≥1);

a sending module 402, configured to send the check packet according to a topmost link label of the label stack, specifically, send the check packet to a next-hop node of the network checking device, where the next-hop node of the network checking device may be an intermediate network node or the to-be-checked network node;

a receiving module 403, configured to receive a notification message, where the notification message is used to notify the network checking device that a feedback node has received the check packet forwarded by the to-be-checked network node, and the feedback node is a next-hop node of the to-be-checked network node; and a determining module 404, configured to determine, according to the notification message and the network topology information, whether a forwarding table of the to-be-checked network node is correct.

Figure 5:
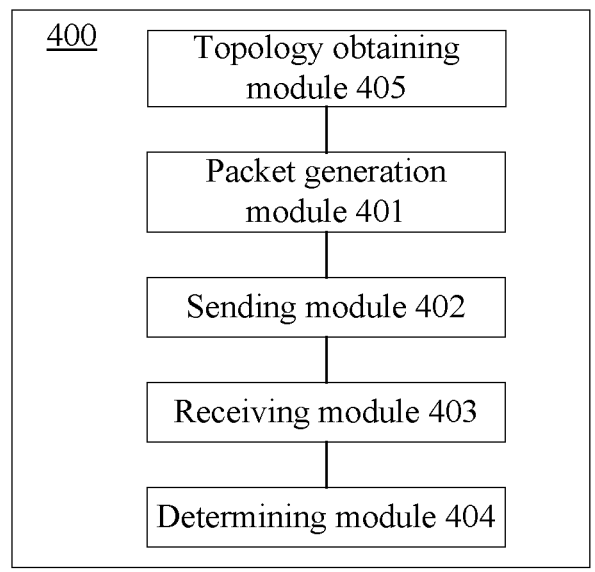
FIG. 5 is a schematic diagram of a structure of another apparatus for checking a forwarding table according to an embodiment of this application.

As shown in FIG. 5, the apparatus 400 further includes a topology obtaining module 405, configured to obtain the network topology information. The network topology information includes a forwarding path from the network checking device to the destination IP address and route information of each hop on the forwarding path. The route information includes a link label.

The topology obtaining module 405 may first obtain the network topology information by using a network topology management apparatus. The network topology management apparatus may be an SDN controller. During specific implementation, the apparatus 400 and the network topology management apparatus may be implemented on a same physical device or different physical devices.

The packet generation module 401 is specifically configured to determine, according to the destination IP address and the network topology information, the forwarding path from the network checking device to the destination IP address and the to-be-checked network node on the forwarding path; determine, according to the network topology information, the quantity N of hops from the network checking device to the to-be-checked network node and a link label of each hop; and generate the check packet according to the quantity N of hops and the link label of each hop.

The to-be-checked network node receives the check packet, pops the topmost link label of the label stack, subtracts 1 from the value of TTL, determines that the label stack is empty, that is, it may be understood that the value of TTL in the check packet is 1, and forwards the check packet on an IP route to a feedback node according to the destination IP address and the forwarding table of the to-be-checked network node. The feedback node is the next hop of the to-be-checked network node.

The notification message includes an IP address of the feedback node, and is sent by the feedback node when the value of TTL in the check packet is 0. Specifically, the feedback node receives the check packet forwarded by the to-be-checked network node, and subtracts 1 from the value of TTL. As a result, the value of TTL is 0, and the feedback node is enabled to send the notification message, for example, an ICMP packet to the network checking device.

The determining module 404 is specifically configured to determine, according to the network topology information and the IP address of the feedback node in the notification message, whether the feedback node that sends the notification message is consistent with a route in the network topology information. When the feedback node is consistent with the route in the network topology information, the determining module 404 determines that the forwarding table of the to-be-checked network node is correct. When the feedback node is inconsistent with the route in the network topology information, the determining module 404 determines that the forwarding table of the to-be-checked network node is incorrect.

Figure 6:
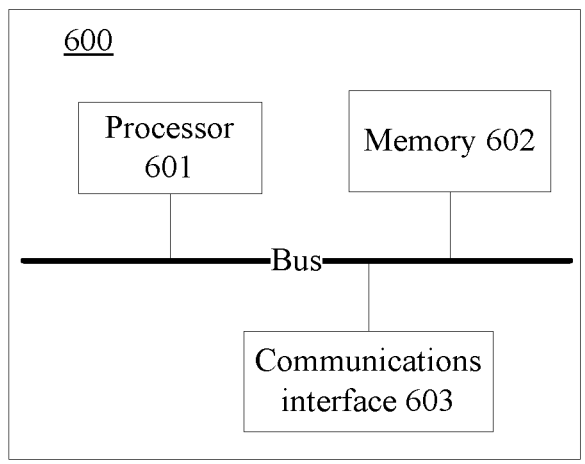
FIG. 6 is a schematic diagram of a structure of a network checking device according to an embodiment of this application.

Referring to FIG. 6, FIG. 6 shows a network checking device 600 provided by an embodiment of this application. The network checking device 600 is configured to implement the method for checking a forwarding table in the embodiment shown in FIG. 2, FIG. 3A, FIG. 3B, and FIG. 3C of this application. The network checking device includes a processor 601, a memory 602, and a communications interface 603.

The processor 601, the memory 602, and the communications interface 603 are connected to each other by using a bus 604. The bus 604 may be a Peripheral Component Interconnect (PCI) bus, an extended industry standard architecture (EISA) bus, or the like. The bus may be classified into an address bus, a data bus, a control bus, and the like. For ease of representation, only one bold line is used to represent the bus in FIG. 6, but this does not mean that there is only one bus or only one type of bus.

The memory 602 is configured to store network topology information. The network topology information includes a forwarding path from the network checking device to a destination IP address and route information of each hop on the forwarding path. The route information includes a link label.

The processor 601 is configured to generate a check packet according to the destination IP address and the network topology information, where the check packet includes a label stack, TTL, a source IP address, and the destination IP address; where the label stack includes N link labels, a value of TTL is N+1, the source IP address is an IP address of the network checking device, N is a quantity of hops from the network checking device to a to-be-checked network node, and N≥1; send the check packet according to a topmost link label of the label stack by using the communications interface 603; receive, by using the communications interface 603, a notification message sent by a feedback node, where the notification message is used to notify the network checking device that the feedback node has received the check packet forwarded by the to-be-checked network node; and determine, according to the notification message and the network topology information, whether a forwarding table of the to-be-checked network node is correct. The feedback node is a next-hop node of the to-be-checked network node.

The processor 601 is specifically configured to determine, according to the network topology information, the quantity N of hops from the network checking device to the to-be-checked network node and a link label of each hop, and generate the check packet according to the quantity N of hops from the network checking device to the to-be-checked network node and the link label of each hop.

The processor 601 is further configured to obtain the network topology information. Specifically, the processor 601 may obtain the network topology information by using a network topology management apparatus. The network topology management apparatus may be an SDN controller. During specific implementation, the network checking device and the network topology management apparatus may be implemented on a same physical device or different physical devices.

The memory 602 may include a volatile memory, for example, a random access memory (RAM). The memory 602 may include a non-volatile memory, for example, a flash memory, a hard disk (HDD), or a solid-state drive (SSD). The memory 602 may include a combination of the foregoing types of memories.

In the embodiment of this application, the communications interface 603 represents an interface for communication between the network checking device 600 and other network nodes in a network, and there may be one or more communications interfaces. For ease of description, the communications interface 603 is used in this application, but this does not limit the technical solution in this application.

The processor 601 may be a central processing unit (CPU), a network processor (NP), or a combination of a CPU and an NP. The processor 601 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL) device, or any combination thereof.

Optionally, the memory 602 is further configured to store a program instruction. The processor 601 may invoke the program instruction stored in the memory 602 and execute one or more steps or an optional implementation of the network checking device in the embodiment shown in FIG. 2, FIG. 3A, FIG. 3B, and FIG. 3C, to implement the method for checking a forwarding table shown in FIG. 2, FIG. 3A, FIG. 3B, and FIG. 3C.

The network checking device provided in the embodiment of this application generates, according to the destination IP address and the network topology information, a check packet that includes a specific link label and a specific TTL value, to check whether forwarding tables of any one or more network nodes on the forwarding path destined for the destination IP address are incorrect. Therefore, fault location efficiency is increased.

On a basis of the method for checking a forwarding table provided in the embodiment shown in FIG. 2, FIG. 3A, FIG. 3B, and FIG. 3C in this application, the following describes in detail a network node that implements the method.

Figure 7:
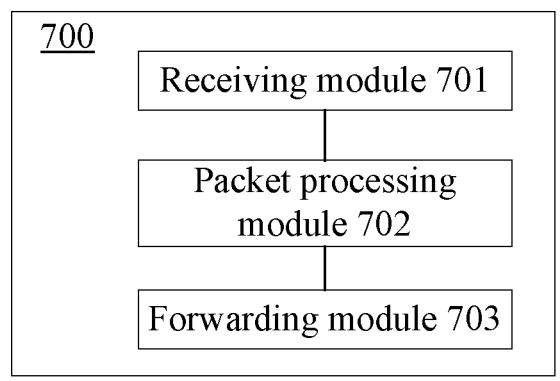
FIG. 7 is a schematic diagram of a structure of a network node according to an embodiment of this application.

Referring to FIG. 7, FIG. 7 shows a network node 700 provided by an embodiment of this application. The network node 700 is configured to implement the method for checking a forwarding table in the embodiment shown in FIG. 2, FIG. 3A, FIG. 3B, and FIG. 3C of this application. The network node 700 includes:

a receiving module 701, configured to receive a check packet, where the check packet includes a label stack, TTL, a source IP address, and a destination IP address; the label stack includes N link labels, N is a positive integer greater than or equal to 1, and a value of TTL is N+1;

a packet processing module 702, configured to pop a topmost link label of the label stack, subtract 1 from the value of TTL, and determine whether the label stack is empty; and a forwarding module 703, configured to, when the packet processing module 702 determines that the label stack is empty, forward the check packet to a feedback node according to the destination IP address and a forwarding table of the network node. In this case, the network node is a to-be-checked network node, and the feedback node is a next hop of the to-be-checked network node. The feedback node receives the check packet (in this case, the check packet does not include a link label and the value of TTL is 1), subtracts 1 from the value of TTL, and sends a notification message, for example, an ICMP packet to a network checking device when determining that the value of TTL is 0, so that the network checking device determines, according to the notification message and the network topology information, whether the forwarding table of the network node is correct.

The forwarding module 703 is further configured to, when the packet processing module 702 determines that the label stack is not empty, forward the check packet according to the topmost link label of the label stack. In this case, the network node is an intermediate network node, and forwards the check packet according to the link label until the check packet is sent to the to-be-checked network node.

The network topology information includes route information of each hop from the network checking device to a device corresponding to the destination IP address. The network topology information may specifically include the forwarding path from the network checking device to the destination IP address and route information of each hop on the forwarding path. The route information includes a link label.

Figure 8:
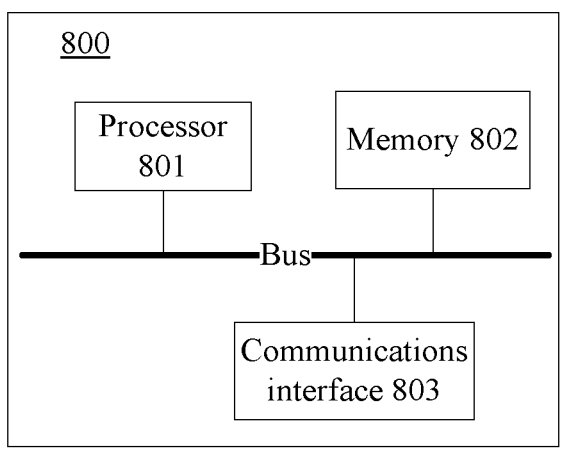
FIG. 8 is a schematic diagram of a structure of another network node according to an embodiment of this application.

Referring to FIG. 8, FIG. 8 shows another network node 800 provided by an embodiment of this application. The network node 800 is configured to implement the method for checking a forwarding table in the embodiment shown in FIG. 2, FIG. 3A, FIG. 3B, and FIG. 3C of this application. The network node 800 includes a processor 801, a memory 802, and a communications interface 803.

The processor 801, the memory 802, and the communications interface 803 are connected to each other by using a bus 804. The bus 804 may be a PCI bus, an EISA bus, or the like. The bus may be classified into an address bus, a data bus, a control bus, and the like. For ease of representation, only one bold line is used to represent the bus in FIG. 8, but this does not mean that there is only one bus or only one type of bus.

The memory 802 is configured to store a forwarding table. The forwarding table includes a destination IP address and a next hop.

The processor 801 is configured to receive a check packet, where the check packet includes a label stack, TTL, a source IP address, and the destination IP address, the label stack includes N link labels, N is a positive integer greater than or equal to 1, and a value of TTL is N+1; pop a topmost link label of the label stack, subtract 1 from the value of TTL, and determine whether the label stack is empty; and when determining that the label stack is empty, forward the check packet to a feedback node according to the destination IP address and the forwarding table. In this case, the network node is a to-be-checked network node, and the feedback node is a next hop of the to-be-checked network node. The feedback node receives the check packet (in this case, the check packet does not include a link label and the value of TTL is 1), subtracts 1 from the value of TTL, and sends a notification message, for example, an ICMP packet, to a network checking device when determining that the value of TTL is 0, so that the network checking device determines, according to the notification message and network topology information, whether the forwarding table of the network node is correct.

The network topology information includes route information of each hop from the network checking device to a device corresponding to the destination IP address (a to-be-checked IP address). The network topology information may specifically include a forwarding path from the network checking device to the to-be-checked IP address and route information of each hop on the forwarding path. The route information includes a link label.

The processor 801 is further configured to, when determining that the label stack is not empty, forward the check packet according to the topmost link label of the label stack. In this case, the network node is an intermediate network node, and forwards the check packet according to the topmost link label of the label stack until the check packet is sent to the to-be-checked network node.

The memory 802 may include a volatile memory, for example, a RAM. The memory 802 may include a non-volatile memory, for example, a flash memory, an HDD, or an SSD. The memory 802 may include a combination of the foregoing types of memories.

In the embodiment of this application, the communications interface 803 represents an interface for communication between the network node 800 and other network nodes in a network, and there may be one or more communications interfaces. For ease of description, the communications interface 803 is used in this application, but this does not limit the technical solution in this application.

The processor 801 may be a CPU, an NP, or a combination of a CPU and an NP. The processor 801 may be a hardware chip. The hardware chip may be an ASIC, a PLD, or a combination thereof. The PLD may be a CPLD, an FPGA, a GAL device, or any combination thereof.

Optionally, the processor 801 is further configured to obtain the forwarding table. Specifically, the processor 801 generates the forwarding table according to a routing table. The memory 802 is further configured to store the routing table. The network node may use a conventional method to obtain the routing table. Details are not described herein.

Optionally, the memory 802 is further configured to store a program instruction. The processor 801 may invoke the program instruction stored in the memory 802 and execute one or more steps or an optional implementation of the network node in the embodiment shown in FIG. 2, FIG. 3A, FIG. 3B, and FIG. 3C, to implement the method for checking a forwarding table shown in FIG. 2, FIG. 3A, FIG. 3B, and FIG. 3C.

After receiving a check packet that is sent by the network checking device and that includes a specific link label and specific TTL, the network node provided in the embodiment of this application subtracts 1 from a value of TTL in the check packet, and forwards the check packet to the feedback node if the network node is the to-be-checked network node. The feedback node receives the check packet and also subtracts 1 from the value of TTL. As a result, the value of TTL is 0 and the feedback node is enabled to send the notification message to the network checking device. In this way, the network checking device may determine, according to the network topology information and an IP address of the feedback node in the notification message, whether the forwarding table of the to-be-checked network node is correct.

The foregoing descriptions are merely example implementations of the present invention, but are not intended to limit the protection scope of the present invention. Therefore, the protection scope of the present invention shall be subject to the protection scope of the claims.

The invention claimed is:

1. A method for checking a forwarding table, comprising:
   generating, by a network check device, a check packet according to network topology information, wherein the check packet comprises a source Internet Protocol (IP) address and a destination IP address, wherein the source IP address is an IP address of the network check device, the check packet further comprises a label stack comprising N link labels, N is a quantity of hops from the network check device to a to-be-checked network node, and N≥1;
   sending, by the network check device, the check packet to the to-be-checked network node according to the label stack;
   receiving, by the network check device, a notification message sent by a feedback node, wherein the notification message indicates that the feedback node has received the check packet forwarded by the to-be-checked network node, and the feedback node is a next-hop node of the to-be-checked network node; and
   determining, by the network check device according to the notification message and the network topology information, whether a forwarding table of the to-be-checked network node is correct.

2. The method according to claim 1, wherein the step of generating the check packet comprises:

determining, by the network check device according to the destination IP address and the network topology information, a forwarding path from the network check device to the destination IP address and the to-be-checked network node on the forwarding path, wherein the network topology information comprises the forwarding path and route information of each hop on the forwarding path; and determining, by the network check device according to the network topology information, the quantity of hops from the network check device to the to-be-checked network node and a link label of each hop, and generating the check packet according to the quantity of hops and the link label of each hop.

3. The method according to claim 1, wherein the check packet further comprises time to live (TTL), a value of TTL set by the network check device is N+1, and the method further comprises:

receiving, by the feedback node, the check packet forwarded by the to-be-checked network node; and subtracting, by the feedback node, 1 from the value of TTL carried in the received check packet, and sending the notification message when determining that the value of TTL is 0.

4. The method according to claim 1, wherein the step of determining whether the forwarding table of the to-be-checked network node is correct comprises:

determining the forwarding table of the to-be-checked network node is correct when the feedback node that sends the notification message is consistent with the network topology information; and determining the forwarding table of the to-be-checked network node is incorrect when the feedback node that sends the notification message is inconsistent with the network topology information.

5. A network check device comprising:
a memory comprising instructions; and
a processor coupled to the memory, wherein the processor is configured to execute the instructions to:
generate a check packet according to network topology information, wherein the check packet comprises a source Internet Protocol (IP) address and a destination IP address, the source IP address is an IP address of the network check device, the check packet further comprises a label stack comprising N link labels, N is a quantity of hops from the network check device to a to-be-checked network node, and N≥1;
send the check packet to the to-be-checked network node according to the label stack;
receive a notification message sent by a feedback node, wherein the notification message indicates that the feedback node has received the check packet forwarded by the to-be-checked network node, and the feedback node is a next-hop node of the to-be-checked network node; and
determine, according to the notification message and the network topology information, whether a forwarding table of the to-be-checked network node is correct.

6. The network check device according to claim 5, wherein the processor is configured to execute the instructions to:

determine, according to the destination IP address and the network topology information, a network path and the to-be-checked network node on the network path, wherein the forwarding path comprises the network path;

determine, according to the network topology information, the quantity of hops from the network check device to the to-be-checked network node and a link label of each hop; and generate the check packet according to the quantity of hops and the link label of each hop.

7. The network check device according to claim 5, wherein the processor is configured to execute the instructions to obtain the network topology information from a software-defined networking (SDN) controller.

8. The network check device according to claim 5, wherein the check packet further comprises time to live (TTL), a value of TTL set by the network check device is N+1, and the notification message is sent by the feedback node when the value of TTL in the check packet is 0, and 1 is subtracted from the value of TTL by each network node receiving the check packet.

9. The network check device according to claim 5, wherein the processor is configured to execute the instructions to:

determine the forwarding table of the to-be-checked network node is correct when the feedback node that sends the notification message is consistent with the network topology information; and determine the forwarding table of the to-be-checked network node is incorrect when the feedback node that sends the notification message is inconsistent with the network topology information.

10. A system for checking a forwarding table, comprising:
a network check device;
a to-be-checked network node; and
a feedback node, wherein the feedback node is a next hop of the to-be-checked network node;
wherein the network check device is configured to generate a check packet according to a destination Internet Protocol (IP) address and network topology information, and send the check packet to the to-be-checked network node, wherein the check packet comprises a source IP address and the destination IP address, the source IP address is an IP address of the network check device, wherein the check packet further comprises a label stack comprising N link labels, N is a quantity of hops from the network check device to the to-be-checked network node, and N≥1, and the check packet is sent to the to-be-checked network node according to the label stack;
the to-be-checked network node is configured to receive the check packet, and forward the check packet to the feedback node according to the destination IP address and a forwarding table of the to-be-checked network node; and
the feedback node is configured to receive the check packet and send a notification message to the network check device for the network check device to determine whether the forwarding table of the to-be-checked network node is correct.

11. The system according to claim 10, wherein
the to-be-checked network node is further configured to pop a topmost link label of the label stack of the check packet received by the to-be-checked network node.

12. The system according to claim 10, wherein the network check device is configured to generate the check packet by performing operations of:

determining, according to the destination IP address and the network topology information, a forwarding path from the network check device to the destination IP address and the to-be-checked network node on the forwarding path, wherein the network topology information comprises the forwarding path and route information of each hop on the forwarding path;

determining, according to the network topology information, the quantity of hops from the network check device to the to-be-checked network node and a link label of each hop, and generating the check packet according to the quantity of hops and the link label of each hop.

13. The system according to claim 12, wherein the check packet further comprises a label stack, time to live (TTL), a value of TTL set by the network check device is N+1; wherein the to-be-checked network node is further configured to subtract 1 from the value of TTL carried in the received check packet by the to-be-checked network node; and the feedback node is further configured to subtract 1 from the value of TTL carried in the received check packet by the feedback node, and determine that the value of TTL is 0 before sending the notification message to the network check device.

14. The system according to claim 13, wherein the system further comprises one or more intermediate network nodes, and the one or more intermediate network nodes are configured to:

pop a topmost link label of the label stack and subtract 1 from the value of TTL carried in the check packet received respectively;

determine that the label stack is not empty; and forward the check packet according to the topmost link label of the label stack carried in the check packet received respectively until the check packet arrives at the to-be-checked network node.

15. The system according to claim 10, wherein the network check device is configured to:

determine the forwarding table of the to-be-checked network node is correct when the feedback node that sends the notification message is consistent with the network topology information; and determine the forwarding table of the to-be-checked network node is incorrect when the feedback node that sends the notification message is inconsistent with the network topology information.

* * * * *